(12) United States Patent
Du et al.

(10) Patent No.: US 6,181,947 B1
(45) Date of Patent: Jan. 30, 2001

(54) SYSTEM FOR THE WIRELESS TRANSMISSION OF A FRAME-SYNCHRONIZED SIGNAL BETWEEN A RADIO BASE STATION AND AT LEAST ONE MOBILE TERMINAL

(75) Inventors: Yonggang Du, Aachen; Rolf Kraemer, Herzogenrath, both of (DE)

(73) Assignee: U.S. Philips Corporation, New York, NY (US)

(*) Notice: Under 35 U.S.C. 154(b), the term of this patent shall be extended for 0 days.

(21) Appl. No.: 09/027,600

(22) Filed: Feb. 23, 1998

(30) Foreign Application Priority Data

Feb. 28, 1997 (DE) .............................................. 197 08 182

(51) Int. Cl.⁷ ............................. H04L 12/56; H04Q 11/04
(52) U.S. Cl. ........................ 455/509; 455/450; 455/517; 370/336; 370/345; 370/350; 370/352; 370/354
(58) Field of Search ............................ 455/450, 452, 455/509, 517; 370/509, 352, 353, 354, 336, 337, 345, 350

(56) References Cited

U.S. PATENT DOCUMENTS

| | | | |
|---|---|---|---|
| 4,987,571 | * 1/1991 | Haymond et al. | 370/445 |
| 5,392,280 | * 2/1995 | Zheng | 370/353 |
| 5,533,019 | * 7/1996 | Jayapalan | 370/352 |
| 5,570,355 | * 10/1996 | Dail et al. | 370/352 |
| 5,825,770 | * 10/1998 | Coady et al. | 370/378 |
| 5,933,426 | * 8/1999 | Motoori | 370/352 |

OTHER PUBLICATIONS

"WATMnet: A Prototype Wireless ATM System for Multimedia Personal Communication", Dipankar Raychaudhuri, Leslie J. French, Robert J. Siracusa, Subir K. Biswas, Ruizi Yuan, Parthasarathy Narasimhan and Cesar A. Johnston, Journal on Selected Areas in Communications, vol. 15, No. 1, Jan. 1997, pp. 83–95.

* cited by examiner

Primary Examiner—Lee Nguyen
Assistant Examiner—Simon Nguyen
(74) Attorney, Agent, or Firm—Dicran Halajian

(57) ABSTRACT

The invention relates to a system for the wireless transmission of a frame-synchronized signal between a base radio station (1) and at least one mobile terminal (2), which base radio station is provided for defining, prior to the transmission of data of a synchronous service, the periodically occurring frames which are to be used and a constant number of synchronous channels for the duration of the connection. The base radio station (1) and at least one mobile terminal (2) are provided for transmitting packets containing data of an asynchronous service in the frame-synchronized signal. The base radio station (1) is provided for defining for each respective frame a number of asynchronous channels used for transmitting the packets.

11 Claims, 2 Drawing Sheets

SYSTEM FOR THE WIRELESS TRANSMISSION OF A FRAME-SYNCHRONIZED SIGNAL BETWEEN A RADIO BASE STATION AND AT LEAST ONE MOBILE TERMINAL

BACKGROUND OF THE INVENTION

1. Field of the Invention

The invention relates to a system for the wireless transmission of a frame-synchronized signal between a base radio station and at least one mobile terminal, which base radio station is provided for defining, prior to the transmission of data of a synchronous service, the periodically occurring frames which are to be used and a constant number of synchronous channels for the duration of the connection.

2. Description of Related Art

Such a system is, for example, a radio transmission system operating according to the GSM standard and for which embodiments of the GSM system are discussed in the publication "Datenübertragung mit GSM", Funkschau, no. 3, 1997, pp. 68 to 70. In this article is described, more particularly, the data exchange between data networks (for example Internet, X.25) and mobile terminals. For example time slots or channels for a service are then combined to reach higher transmission rates.

SUMMARY OF THE INVENTION

It is an object of the invention to provide a system for the wireless transmission of a frame-synchronized signal between a base radio station and at least one mobile terminal, which system has a higher flexibility.

The object of the invention is achieved by a system of the type defined in the opening paragraph in that the base radio station and at least one mobile terminal are provided for transmitting packets containing data of an asynchronous service in the frame-synchronized signal and in that the base radio station is provided for defining for each respective frame a number of asynchronous channels used for transmitting the packets.

Such a wireless system may be, for example, a radio transmission system, an infrared or an ultrasound system. A base radio station generally comprises at least a base radio station which controls, for example, the radio traffic with the mobile terminals and may also include, for example, mobile switching centers. Service data are transmitted between the base radio station and the mobile terminals. A distinction is then to be made between data of a synchronous and of an asynchronous service. Synchronous service data are, for example, speech data, that is, data of a conversation between at least two participants, in which a continuous data flow without long delay times is necessary. Asynchronous service data are packets produced by a packet transmission system. They may be, for example, cells in the asynchronous transfer mode (ATM). It is also possible for the base radio station or a mobile terminal to combine data to packets and transmit the packets.

The base radio station defines the synchronous channels for the duration of a connection, which channels are used for receiving synchronous data. Such a synchronous channel need not be rendered available to each successive frame, but may also be used periodically, for example, every third frame. If a connection is set up for a synchronous service, respective synchronous channels are then to be rendered available for the whole duration of the connection. But this does not exclude that different channels with different time frames are used for this connection. For example, a synchronous service may use the channels referenced 4, 6 and 7 during a first frame, and the channels referenced 5, 6 and 8 during a second frame.

The range of the frame that is not needed by the synchronous services is used for receiving packets or data of an asynchronous service. The seizure of the asynchronous channels is renewed for each frame by the base radio station. For example, an asynchronous service may use the asynchronous channels 4, 8, 9 and 11 during a first frame, the asynchronous channels 4 and 7 during a second frame, no asynchronous channel during a third frame and the asynchronous channels 1, 2 and 4 during a fourth frame. As a result of the measures according to the invention, the system can react to load changes much more flexibly than the known systems.

A mobile terminal announces the respective service requirements to the base radio station over at least one control channel of the frame-synchronized signal. The base radio station is provided for defining the channels for the transmission between the radio base station and at least one mobile terminal and, over a control channel of the frame-synchronized signal, for informing at least one mobile terminal of the channels that have been allocated. In addition to the synchronous and asynchronous channel, the frame-synchronized signal includes control channels over which the radio links are set up and cleared and over which control data are exchanged between base radio station and mobile terminal. It is also possible that the number of control channels and the number of bits of one control channel are varied. The control channels and the synchronous and asynchronous channels may optionally be divided in the frame. The simplest realization is found when the control channels, the synchronous channels and the asynchronous channels are combined.

A mobile terminal and a base radio station include an insertion-cum-extraction device working under the control of a MAC control circuit for the insertion or extraction of data of a synchronous service into or from at least one synchronous channel and inserting or extracting packets into or from at least one asynchronous channel. The base radio station is provided for allocating the available asynchronous channels per frame in dependence on the number and priority of packets in a buffer device of the base radio station or of a mobile terminal.

The base radio station or a mobile terminal insert a word into a synchronous channel and a packet into an asynchronous channel. The base radio station additionally defines the number of the synchronous and asynchronous channels per frame.

The invention further relates to a base radio station and a mobile terminal.

These and other aspects of the invention will be apparent from and elucidated with reference to the embodiments described hereinafter.

DETAILED DESCRIPTION OF THE DRAWINGS

Figure 1:
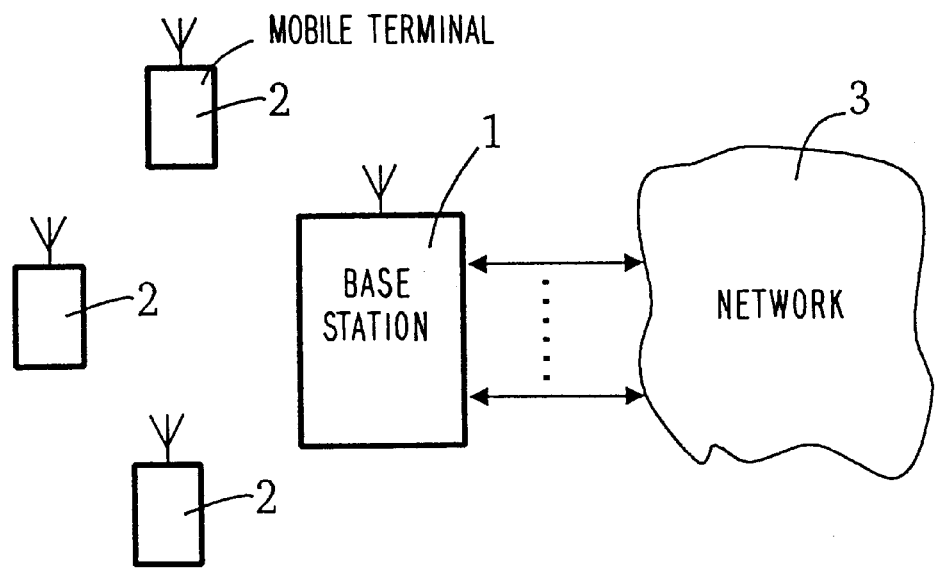
FIG. 1 shows a radio transmission system.

FIG. 1 shows an exemplary embodiment of a radio transmission system which comprises at least a base radio station 1 and a plurality of mobile terminals 2 which can exchange messages with other mobile terminals 2 via the base radio station, or directly with other terminals, or with the other terminals via a network 3. The radio transmission between a mobile terminal 2 and a base radio station 1 may be effected, for example, according to a TDMA, FDMA or CDMA method or by a combination of these or other methods. The network 3 may be a wired network which is coupled to other networks and/or other base radio stations. An example for such a wired network is the Integrated Services Digital Network (ISDN) and the broadband ISDN, which operates in the Asynchronous Transfer Mode (ATM).

In a network operating in the asynchronous transfer mode, information and messages are transmitted by means of cells. A cell contains a header field of 5 bytes and an information field of 48 bytes. The information contained in the header field of the cell is particularly used for addressing and for executing switching functions.

A mobile terminal comprises not only the devices necessary for radio transmission, but also, for example, a device for voice communication, a personal computer, a workstation, and so on.

Figure 2:
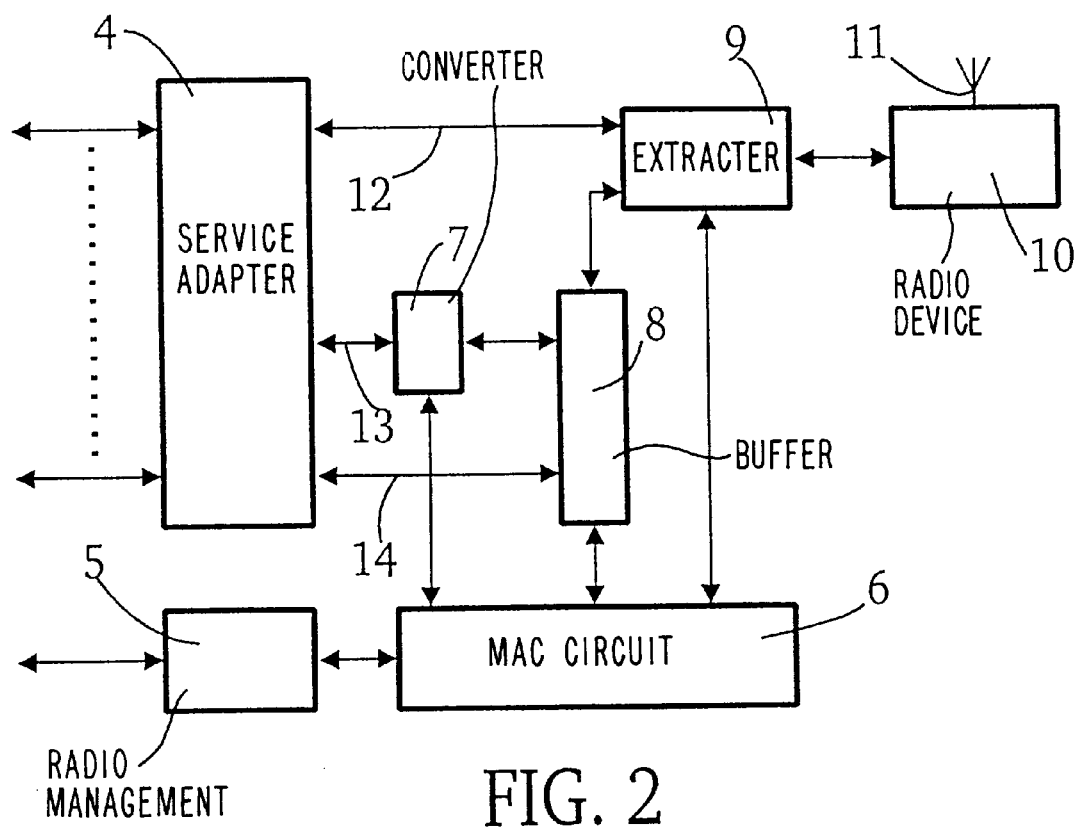
FIG. 2 shows a block circuit diagram of the base radio station or mobile terminals shown in FIG. 1.

A block circuit diagram of the base radio station 1 or of a mobile terminal 2 is represented in detail in FIG. 2. The diagram shows a service adapter 4, a radio management arrangement 5, a MAC circuit 6 (MAC=Medium Access Control), a converter device 7, a buffer device 8, an insertion-cum-extraction device 9 and a radio device 10 with connected antenna 11. The service adapter 4 receives various data streams from the network 3 if the arrangement shown in FIG. 2 forms part of the base radio station 1, or from specific arrangements (Personal Computer, voice communication device, and so on) if the arrangement shown in FIG. 2 forms part of a mobile terminal 2. Such data streams may be, for example, plesiochronous data having various hierarchical levels, data of the synchronous digital hierarchy, multiplex data having various bit rates (for example, 64 kbit/s, 2 Mbit/s), data according to the internet protocol (IP), telefax data, data according to the X.25 protocol, data according to the Frame Relay Protocol, an ATM cell stream, and so on. The service adapter 4 may be arranged, for example, as a multiplexer and combine the various data streams to a total of three basic data streams 12 to 14. The data stream 12 contains all the synchronous data, that is, for example, data of a conversation (speech data) between at least two participants for which a continuous data flow is necessary without lengthy delay periods. Furthermore, the service adapter 4 produces an asynchronous data stream 13 which contains data of a service for which no continuous data flow (for example, Internet, X.25, telefax and so on) is necessary. The third data stream 14 represents an ATM cell stream.

The radio management arrangement 5, which may be designed as a microprocessor system, processes data relating to connections (signaling data). For setting up a connection between the base radio station and a mobile terminal, the respective radio management arrangement 5 of the base radio station 1 and of a mobile terminal exchange data via the respective MAC circuit 6, the insertion-cum-extraction device 9 and the radio device 10. Furthermore, the radio management arrangement 5 is provided for, for example, executing channel measurements, for example, by means of test data, or changing carrier frequencies, as required, in the case of poor radio transmission.

The MAC circuit 6 which is arranged, for example, as a microprocessor system, is used for controlling the circuit elements 7, 8 and 9 based on data relating to connections which data are supplied by the radio management arrangement 5. The asynchronous data 13 are converted into an ATM cell stream by means of the converter device 7 and sent to the buffer 8 to be buffered. The MAC circuit 6 then supplies the converter 7 with control data for the header field of a cell to be formed. Furthermore, the converter 7 forms asynchronous data 13 from the ATM cell stream received from the buffer 8, which data are applied to the service adapter 4. Besides the asynchronous data converted into ATM cells, the buffer 8 also stores cells of the ATM cell stream 14 which are received from the service adapter 4. The buffer device 8 also receives data from an insertion-cum-extraction device 9.

The cells produced by the buffer device 8 and the synchronous speech data 12 produced by the service adapter 4 are inserted into a frame-structured signal by means of the insertion-cum-extraction device 9. This frame-structured signal is applied to the radio device 10 which comprises a codec, a modem and a high-frequency section. This radio device 10 transmits and receives high-frequency signals over the antenna 11. Synchronous data 12 and ATM cells are extracted from the frame-structured signal formed from the high-frequency signal received in the radio device 10 and the synchronous data 12 are applied to the service adapter 4 and the ATM cells to the buffer device 8.

The MAC circuit 6 receives connection-related data from the radio management arrangement 5 as was discussed above. Each data stream 12, 13 and 14 is assigned signaling data which are received from a signaling interface (not shown here). The data relating to the respective connections are then accordingly assigned to the synchronous data 12 as a function of time. The connection-related information of the ATM cells is contained in the header field. After a cell is stored in the buffer device 8, the connection-related data are extracted from the header field of the cell and rendered available in the MAC circuit 6. The MAC circuit 6 further receives connection-related data of frame-structured signals received via the radio device 10 from the insertion-cum-extraction device 9. For setting up radio connections, the MAC circuit 6 exchanges control data received from the radio management arrangement 5 with the insertion-cum-extraction device 9.

Figure 3:
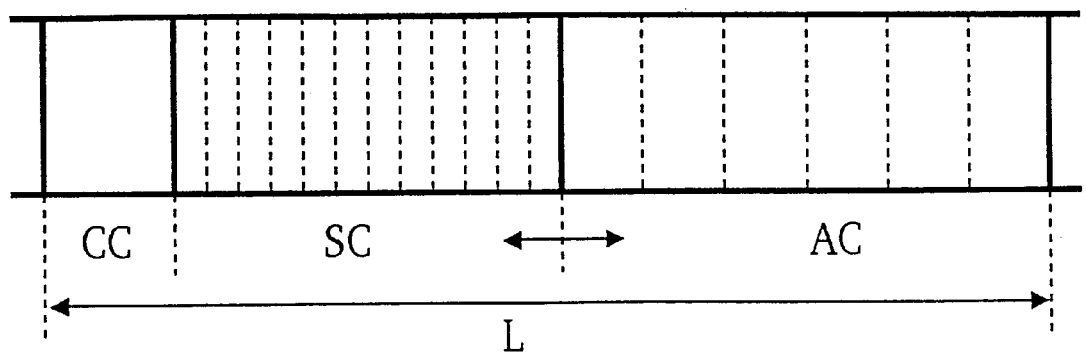
FIG. 3 shows the frame structure of a frame-structured signal used in the radio transmission system shown in FIG. 1.

The frame structure of the frame-structured signal is shown in FIG. 3. The frame includes at least one control channel or control time slot CC, at least one synchronous channel or synchronous time slot SC and at least one asynchronous channel or asynchronous time slot AC. A synchronous channel SC contains a word of a connection assigned to the synchronous data and assigned control information for error protection, as appropriate (for example, CRC data, CRC=Cyclic Redundancy Check), for synchronization, and so on. A word may correspond to one or more bytes. There is assumed that a word has k=8 bits and that the duration of a frame L is equal to 10 ms. A synchronous channel SC then has a bit rate of R=k/L=0.8 kbit/s. If synchronous service data are to be transmitted in a synchronous channel in each successive frame, the minimum bit rate $R_{min}$=0.8 kbit/s. This minimum bit rate may even be further reduced when synchronous service data need not be transmitted in each frame in a synchronous signal, but periodically. If data are transmitted only in every fourth frame, there will be a bit rate of $R_{min}$=0.2 kbit/s.

An asynchronous channel AC contains exactly one ATM cell of 53 bytes and assigned control information, as appropriate. As discussed above, the asynchronous channels AC are provided, in essence, for transmitting data of asynchronous services (for example, Telefax, Internet and so on) in ATM cells over the radio path.

The number of the synchronous and asynchronous channels SC and AC is not defined. Depending on the traffic load, the MAC circuit 6 in the base radio station 1 allocates the synchronous and asynchronous channels SC and AC. In extreme cases, only synchronous channels or only asynchronous channels may be used.

The control channels CC are used for exchanging control data between the base radio station 1 and the mobile terminals 2. What control data may be carried by the control channels may be found, for example, in the publication "WATM net: A Prototype Wireless ATM System for Multimedia Personal Communication", Raychaudhuri et al., IEEE Journal on Selected Areas in Communications, vol. 15, no. 1, January 1977, pp. 83 to 95. The MAC circuit 6 of the base radio station 1 receives from the mobile terminals 2 over these control channels CC the information about how many synchronous and asynchronous channels are needed. Via the information from the mobile terminals 2 and further information about existing and future connections of the radio management arrangement 5 of the base radio station 1, the MAC circuit 6 of the base radio station defines the distribution of the synchronous and asynchronous channels SC and AC. A synchronous channel SC assigned once for a connection is to remain unchanged during the whole connection. For example, for the transmission of synchronous data or the use of a synchronous service, three synchronous channels SC are needed. They may be, for example, the synchronous channels SC referenced 1, 3 and 10. These synchronous channels are assigned to this synchronous service until the end of the connection. Not until then may they be used again for transmitting other synchronous data. Alternatively, it is possible that during the transmission a synchronous service uses first, for example, the synchronous channel SC referenced 10 and, after a plurality of frames, the synchronous channel SC referenced 8. The MAC circuit 6 is thus to verify how many channels of the currently existing synchronous services are needed and to prepare respective synchronous channels in one frame for this purpose.

The allocation of the asynchronous channels AC takes place more flexibly compared with the allocation of the synchronous channels SC. For example, in a first frame, for example four asynchronous channels AC may be rendered available to a service using the ATM cells for transmitting its data (asynchronous service), and in a second, successive, frame one asynchronous channel AC. The allocation of the asynchronous channels is made dynamically. A mobile terminal 2 sends over a control channel CC a message that it has a certain number of cells to be transmitted. The base radio station 1 informs the respective mobile terminal 2 over a control channel which asynchronous time slots are rendered available for transmitting the cells. The priorities assigned to the respective cells may also be taken into account in this respect. For example, the base radio station 1 may allocate the asynchronous channels referenced 2 and 3 to a mobile terminal 2 for a frame i and the asynchronous channels referenced 2, 4 and 6 for a frame i+1. Such an allocation strategy is also used for the reverse direction from the base radio station 1 to the mobile terminal 2.

The synchronous and asynchronous channels are provided for a transmission of data from the base radio station 1 to a mobile terminal 2 (downlink) and for a transmission of data from a mobile terminal 2 to the base radio station 1 (uplink). The channels need not be uniformly distributed over the downlink and uplink.

The insertion-cum-extraction device 9 is controlled by the MAC circuit 6, so that this MAC circuit can insert the synchronous and asynchronous data into the respective channels SC and AC and the control data into the respective control channels CC, or extract them therefrom. Based on waiting times in the insertion-cum-extraction circuit 9, the synchronous data 4 are buffered in a queuing memory (not shown). Such a buffering of ATM is no longer necessary in the insertion-cum-extraction circuit 9, because the cells are read out from the buffer device 8 at the predefined instants after which they are released by the MAC circuit 6 to be inserted into an asynchronous channel.

Figure 4:
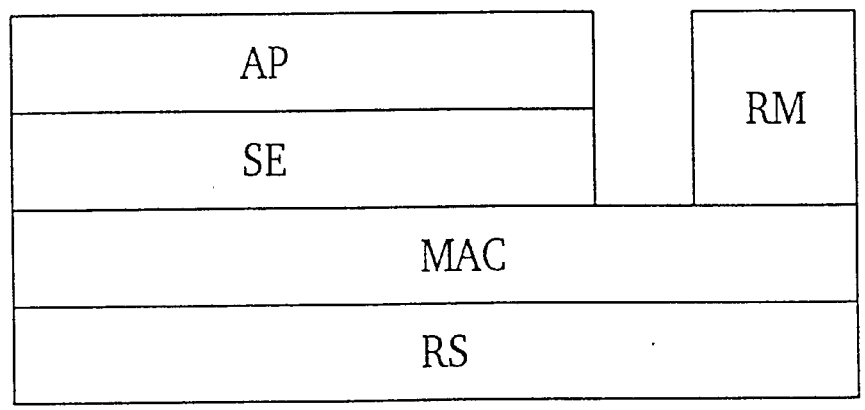
FIG. 4 shows a layer model of the functions of the base radio station and of the mobile terminals coupled to the base radio station via the radio transmission path.

The various functions of the base radio station 1 or a mobile terminal 2 respectively, may be additionally explained with the aid of the layer model outlined in FIG. 4. The bottom layer RS (Radio Sub-system), which is indicated as a physical layer in the OSI layer model, relates to the radio transmission and may be assigned to the radio device 10 and antenna 11. The second layer MAC (Medium Access Control) controls the channel allocation and relates to the circuit elements 6 to 9. Since the circuit element 6 is assigned to the MAC layer, it is also referenced a MAC control circuit 6. The third layer SA (Service Adaptation) is used for adapting the incoming and outgoing data to the network 3 (base radio station 1) or further circuit elements, such as a Personal Computer, Telefax and so on (mobile terminal 2). The top or fourth layer AP (multimedia APplications) relates to the various communication services which may be executed via the radio transmission system. A further function which is referenced an RM layer (Radio Management and control) is available parallel to the third and fourth layers, and is assigned to the radio management arrangement 5.

What is claimed is:

1. A system for a wireless transmission of a frame-synchronized signal comprising:

a base station;

a mobile terminal for communication with said base station;

wherein, prior to said transmission of said frame-synchronized signal of a synchronous service to said mobile terminal, said base station defines frames of said communication; said frames being configured to include synchronous channels and asynchronous channels; said asynchronous channels including packets containing data of an asynchronous service;

said base station further defining a number of said synchronous channels prior to said transmission, wherein said number is constant through said communication; said synchronous channels having time frames which are different from each other.

2. The system of claim 1, wherein said frames periodically include said synchronous channels.

3. The system of claim 1, wherein said number of said synchronous channels repeat in successive ones of said frames.

4. The system of claim 1, wherein said number of said synchronous channels repeat in non-successive ones of said frames.

5. The system of claim 1, wherein said frames periodically include said synchronous channels with at least one of said frames not having said synchronous channels being interposed between said frames which include said synchronous channels.

6. The system of claim 1, wherein one of said frames includes a first set of said number of first synchronous channels and another of said frames includes a second set of said number of second synchronous channels, wherein said first synchronous channels are different from said second synchronous channels.

7. The system of claim 1, wherein said mobile terminal announces service requirement to said base station over control channels included in said frames, and wherein said base station forms an allocation of said synchronous channels and said asynchronous channels and provides said allocation to said mobile station over said control channels.

8. The system of claim 1, wherein said mobile station includes an insertion-cum-extraction device and a control device which controls said insertion-cum-extraction device to insert and extract synchronous data of said synchronous service into and from one of said synchronous channels, and to insert and extract asynchronous data of said synchronous service into and from one of said asynchronous channels.

9. The system of claim 1, wherein said base station allocates said synchronous channels per frame depending on quantity and priority of packets available in a buffer of one said base station and said mobile terminal.

10. A base station in a system for a wireless transmission of a frame-synchronized signal comprising:

a mobile terminal for communication with said base station;

wherein, prior to said transmission of said frame-synchronized signal of a synchronous service to said mobile terminal, said base station defines frames of said communication; said frames being configured to include synchronous channels and asynchronous channels; said asynchronous channels including packets containing data of an asynchronous service;

said base station further defining a number of said synchronous channels prior to said transmission, wherein said number is constant through said communication; said synchronous channels having time frames which are different from each other.

11. A mobile terminal in system for a wireless transmission of a frame-synchronized signal comprising a base station for communication with said mobile terminal;

wherein, prior to said transmission of said frame-synchronized signal of a synchronous service to said mobile terminal, said base station defines frames of said communication; said frames being configured to include synchronous channels and asynchronous channels; said asynchronous channels including packets containing data of an asynchronous service;

said base station further defining a number of said synchronous channels prior to said transmission, wherein said number is constant through said communication; said synchronous channels having time frames which are different from each other.

* * * * *